May 19, 1925.
R. W. STROUT
CLUTCH
Filed July 10, 1924
1,538,600
Fig. 1.
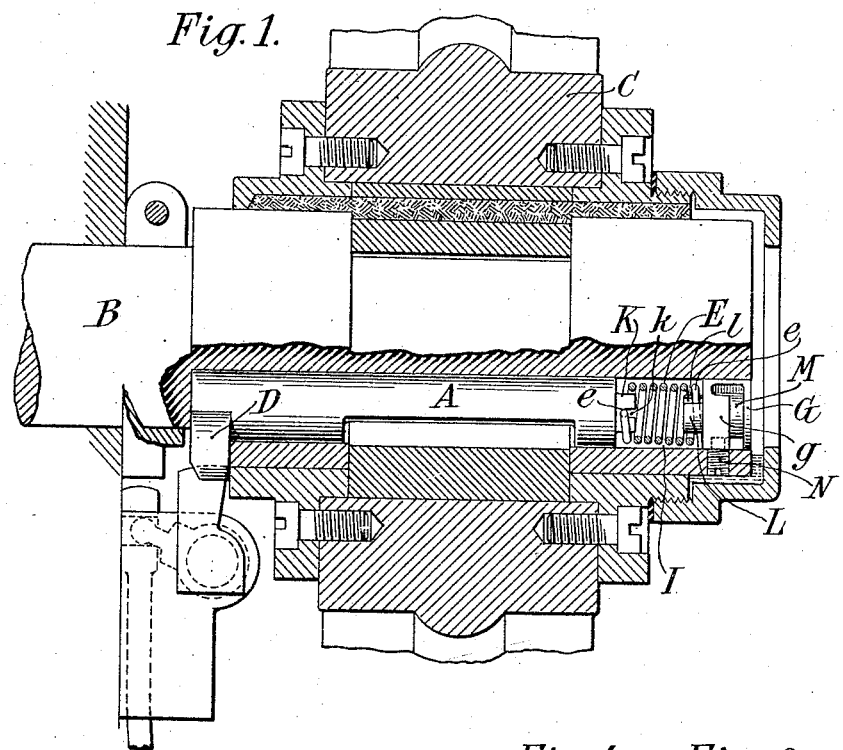
Fig. 2.
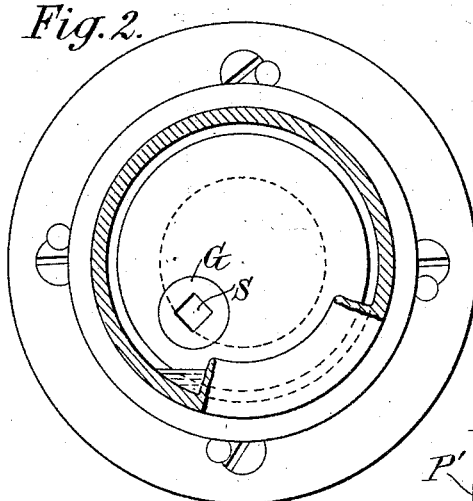
Fig. 4. Fig. 3.
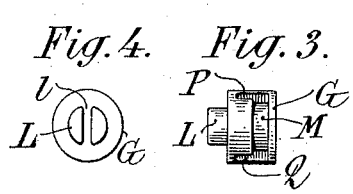
Fig. 5.
Fig. 6.
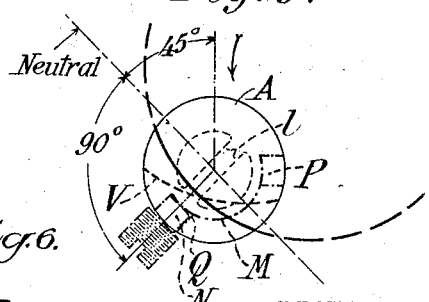
INVENTOR
Robert W. Strout,
By Attorneys,
Fraser Myers & Manley

Patented May 19, 1925.

1,538,600

UNITED STATES PATENT OFFICE.

ROBERT W. STROUT, OF BROOKLYN, NEW YORK, ASSIGNOR TO E. W. BLISS COMPANY, OF BROOKLYN, NEW YORK, A CORPORATION OF WEST VIRGINIA.

CLUTCH.

Application filed July 10, 1924. Serial No. 725,167.

*To all whom it may concern:*

Be it known that I, ROBERT W. STROUT, a citizen of the United States of America, residing in the borough of Brooklyn, county of Kings, city and State of New York, have invented certain new and useful Improvements in Clutches, of which the following is a specification.

This invention relates to clutches and aims to provide improvements therein.

The present invention is an improvement in the type of clutch shown and described in my Patent No. 1,481,444, and others, with regard particularly to the means applying spring tension to the clutch-pin for locking the latter in inoperative position, and provides a simple and reliable means for this purpose.

For a particular description of the invention, reference is made to the accompanying drawings, in which—

Figure 1 is a vertical longitudinal view (partly in section and partly in elevation) of portions of the driving and driven parts of a press and of the clutch, and incorporating the present improvements;

Fig. 2 is an end elevation (with part of the oil ring broken away) of the parts shown in Fig. 1;

Figs. 3 and 4 are respectively side and end views of a part of the clutch;

Fig. 5 is an enlarged diagrammatic view for illustrating the positions of the clutch parts.

Fig. 6 is a modified form of the part shown in Figs. 3 and 4.

The clutch comprises an oscillating key or pin A carried by a crank-shaft B, and adapted to be connected to and disconnected from a fly-wheel C turning on said crank-shaft, by the turning of said key or pin A. The turning of the key A in one direction (to declutching position) is effected through an arm or tail-piece D, while turning thereof in the opposite direction (to clutch) is effected by a spring E, reacting between an anchor-piece G and the said pin A.

The spring E is preferably a coil spring, housed in a bore I in the outer end of the crank-shaft B, coaxial with the said pin A, and the ends *e e* of the spring are conveniently turned across the ends of the coil for fastening to the said pin A and anchor-piece G. The ends K and L of the pin A and anchor-piece G, respectively, are conveniently reduced and slotted, as indicated at *k, l*, to receive and hold the ends *e e* of the spring E.

The anchor-piece G is adapted to be moved to tension the spring E in one direction or the other, and to this end conveniently has a cylindrical portion *g* which fits within the bore I and may be turned on its axis in said bore to tension said spring. The anchor-piece is fastened in position with the spring under tension, by suitable means, as by a pin and slot connection, the slot M being most conveniently circumferentially formed in the anchor-piece G, and the pin N being threaded in the outer wall of said shaft B and extending into said slot.

The circumferential slot M has a length corresponding to an angular rotation of said anchor-piece sufficient to reverse the torsional stress of said spring E and to provide for a positive torsional stress of said spring in opposite directions, and sufficient also to allow for the partial relaxation of torsional stress when said pin A turns under the tension of said spring into clutching position.

The ends of said slot M are provided with recesses P, Q, these recesses conveniently extending axially of the anchor-piece G and spring E, and the spring preferably is arranged to react by compression (or extension) to push the anchor-piece G outward, or in a direction to seat the pin N in the bottom of said recesses P, Q. The recesses P, Q, could, however, be arranged circumferentially in a plane different from that of the slot M, as indicated at P′, Fig. 6, and the spring E react by torsion to seat said pin in said recesses.

To turn the anchor-piece G, the said piece G is first pressed axially or inward against the compressive reaction of said spring E sufficiently to bring pin N out of the slots P, Q, and in line with the circumferential slot M, and then turned.

Any suitable means for turning the anchor-piece G may be provided. To avoid projections from the end of the shaft B, the anchor-piece is preferably provided with a polygonal socket S adapted to receive the end of a correspondingly shaped wrench which is inserted and removed from said socket.

Operation: Referring to Fig. 5, the clutch pin A is shown in normal position when the press is not running; that is, the clutch pin is held out of clutching position by the engagement of a suitable part of the clutch-operating mechanism with the arm or tail-piece D (Fig. 1) on said pin. The pin N is in the bottom of recess Q, and the spring E has been stressed torsionally to react in a counterclockwise direction, the anchor-piece G having been turned from a position where the spring-engaging slot *l* therein was in line with the line marked "Neutral", Fig. 5, to the position shown in that figure, to wit, through approximately 90°. The clutch pin A has a rocking movement to the position indicated by dotted line V, Fig. 5, in turning to clutching position and consequently the torsional stress is relaxed this extent when the clutch pin A turns to clutching position; that is, the tension is relaxed about 45° of a turn. This leaves a torsional stress corresponding to about 45° of a turn for holding the clutch pin A under tension in clutching position.

To lock the clutch pin A in unclutching position (as is customary in setting dies in a press) it is necessary to hold the clutch pin A in the position shown in full lines in Fig. 5. This is done by pressing the anchor-piece G axially against the compression or torsional reaction of spring E, as the case may be, so that the pin N moves out of the recess Q and into the circumferential slot M, whereupon the anchor-piece G is turned in a clockwise direction (looking at it from the end or right in Fig. 1), the torsional stress of the spring E being completely relaxed when the fastening slot *l* reaches the line marked "Neutral", and setting up an opposite torsional stress when turned beyond this line. When the anchor-piece G has been turned clockwise sufficiently for the pin N to enter the recess P. the slot *l* in said anchor-piece G will have moved 45° of a turn clockwise beyond the neutral point and a corresponding torsional stress set up in the spring tending to turn the clutch-pin A clockwise, that is, in a direction away from clutching position. By allowing the spring E to react (by compression or torsion) it acts to press the anchor-piece G outwardly (or otherwise) in a direction to effect the engagement of the pin N in recess P, and thereby lock the said anchor-piece G against turning. Consequently, through the torsional stress of the spring acting between said anchor-piece and clutch-pin, the clutch-pin A is effectively locked in declutching position.

The degrees specifically mentioned are illustrative of the actual construction. A greater or less degree of turn could be given the anchor-piece, as may be desired. The details of construction specifically illustrated and described could be changed without departing from the idea of invention.

What is claimed is:

1. A clutch comprising an oscillating clutch-pin or key, a spring, and an anchor-piece, said spring being attached to said clutch-pin and anchor-piece, said anchor-piece being movable to tension said spring, means for locking said anchor-piece with the spring under tension, said spring acting to press said anchor-piece into engagement with its locking means.

2. A clutch comprising an oscillating clutch-pin or key, a spring, and an anchor-piece, said spring being attached to said clutch pin and anchor-piece, said anchor-piece being movable to tension said spring in opposite directions, whereby the tension on said clutch-pin may be reversed, means for locking said anchor-piece with the spring under tension in either position of said anchor-piece, said spring acting to press said anchor-piece into engagement with its locking means.

3. A clutch according to claim 2, in which said locking means comprises a pin and recesses in which said pin engages in the positions of said anchor-piece in which said spring is tensioned.

4. A clutch according to claim 1, in which said spring is a combined torsion and compression (or extension) spring, and acting by torsional stress upon said clutch-pin and by compression reaction upon said locking means.

5. A clutch according to claim 2, in which said spring is a combined torsion and compression (or extension) spring, and acting by torsional stress upon said clutch-pin and by compression reaction upon said locking means.

6. A clutch comprising an oscillating clutch-pin or key, a spring, and an anchor-piece, said spring being attached to said clutch-pin and anchor-piece, said anchor piece being rotatable to tension said spring with a torsional stress, means for locking said anchor-piece with the spring under torsional stress, said spring also being adapted to react by compression (or extension) to oppose disengagement of said locking means, said anchor-piece being rotatable to tension said spring in two directions, whereby the tension on said clutch-pin may be reversed.

In witness whereof, I have hereunto signed my name.

ROBERT W. STROUT.